(12) United States Patent
Fujisaki et al.

(10) Patent No.: US 7,253,972 B2
(45) Date of Patent: Aug. 7, 2007

(54) TELEPHOTO LENS SYSTEM

(75) Inventors: Junichi Fujisaki, Saitame (JP); Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/208,525

(22) Filed: Aug. 23, 2005

(65) Prior Publication Data

US 2006/0056066 A1    Mar. 16, 2006

(30) Foreign Application Priority Data

Aug. 25, 2004  (JP)  ............................. 2004-245063

(51) Int. Cl.
*G02B 13/02* (2006.01)

(52) U.S. Cl. ...................... 359/747; 359/745; 359/772; 359/779

(58) Field of Classification Search ........ 359/745–748, 359/772, 779
See application file for complete search history.

(56) References Cited

U.S. PATENT DOCUMENTS

| | | | | |
|---|---|---|---|---|
| 3,236,151 A | * | 2/1966 | Rudolf et al. ................ | 359/746 |
| 3,647,281 A | * | 3/1972 | Ikeda ........................... | 359/747 |
| 3,804,494 A | * | 4/1974 | Ito ............................... | 359/746 |
| 3,838,911 A | * | 10/1974 | Ikeda ........................... | 359/747 |
| 3,848,972 A | * | 11/1974 | Nakamura .................... | 359/747 |
| 5,325,234 A | | 6/1994 | Yoneyama | |
| 5,627,685 A | | 5/1997 | Yamanashi | |
| 6,052,235 A | | 4/2000 | Ozaki | |
| 6,313,955 B1 | | 11/2001 | Yoneyama | |
| 6,421,189 B1 | | 7/2002 | Sensui | |
| 6,580,568 B2 | | 6/2003 | Ozaki | |

FOREIGN PATENT DOCUMENTS

| | | |
|---|---|---|
| JP | 5-27163 | 2/1993 |
| JP | 5-27164 | 2/1993 |
| JP | 7-301749 | 11/1995 |
| JP | 8-201687 | 8/1996 |
| JP | 8-234098 | 9/1996 |
| JP | 3288746 | 3/2002 |

OTHER PUBLICATIONS

English Language Abstract of JP 7-301749.
English Language Abstract of JP 3288746.

* cited by examiner

*Primary Examiner*—Jordan M. Schwartz
(74) *Attorney, Agent, or Firm*—Greenblum & Bernstein, P.L.C.

(57) ABSTRACT

A telephoto lens system of a four-lens-group arrangement includes a negative first lens group, a positive or negative second lens group, a negative third lens group and a positive fourth lens group. The telephoto lens system of the four-lens-group arrangement is constituted by less than six lens elements in total. The positive or negative second lens group is constituted by a positive lens element and a negative lens element which are cemented to each other, in this order from the object. The positive lens element has a convex surface with a larger curvature facing toward the object. The positive or negative second lens group satisfies the following condition:

$$0.8 < f2p/|f2n| < 1.4. \qquad (1)$$

11 Claims, 8 Drawing Sheets

Fig.1
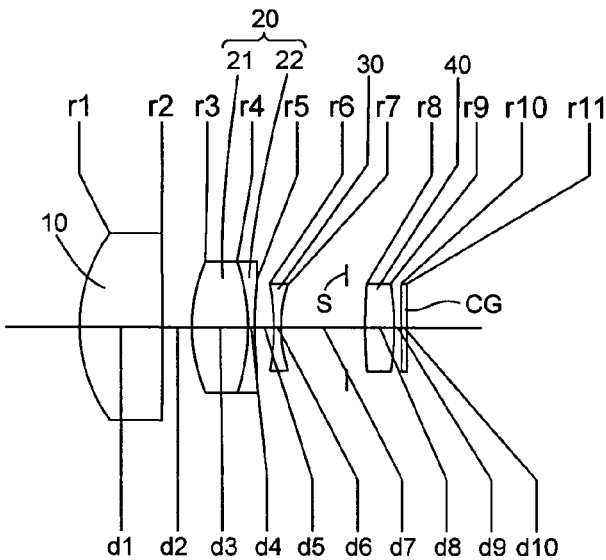
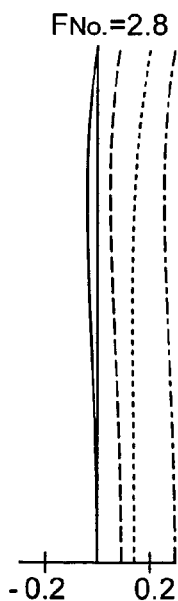
Fig.2A
FNo.=2.8
SPHERICAL
ABERRATION
CHROMATIC
ABERRATION
Fig.2B
y=5.95
— d Line
······ g Line
--- C Line
-·-·- A Line
LATERAL
CHROMATIC
ABERRATION
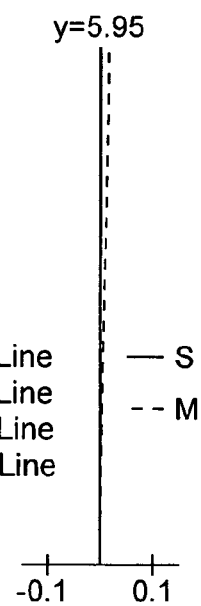
Fig.2C
y=5.95
— S
-- M
ASTIGMATISM
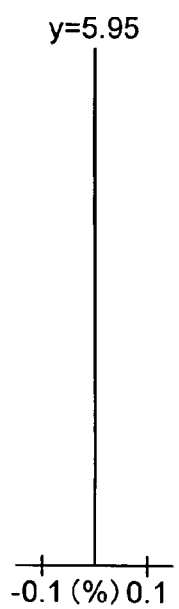
Fig.2D
y=5.95
DISTORTION Fig.3
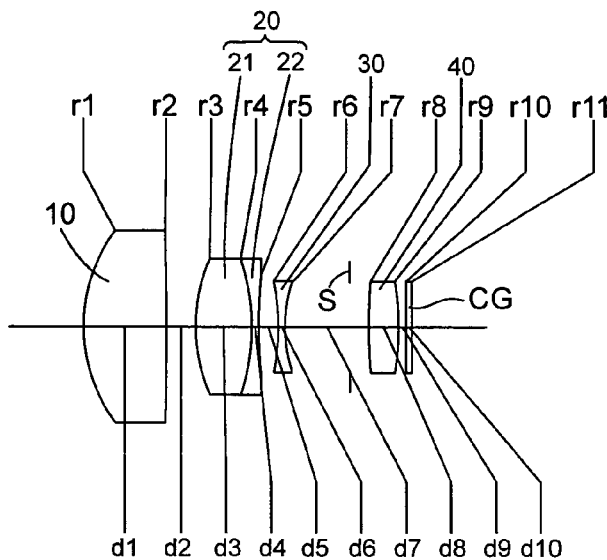
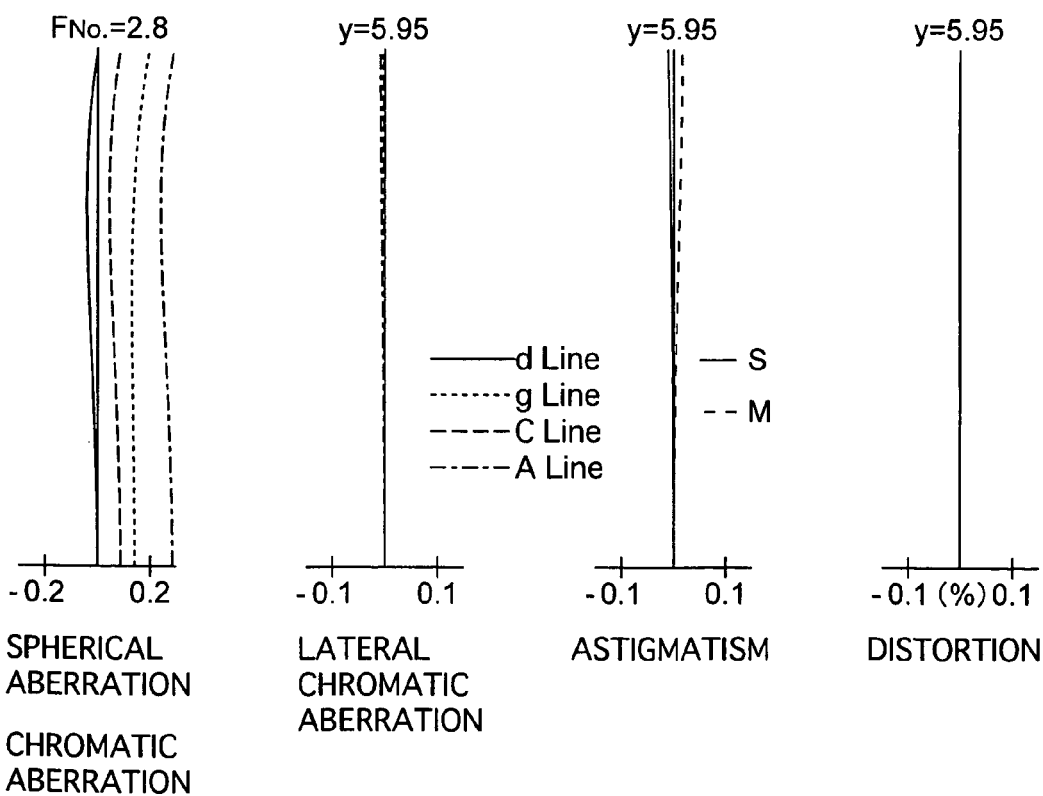

FNo.=2.8

SPHERICAL ABERRATION

CHROMATIC ABERRATION y=5.95

—— d Line
·········· g Line
— — C Line
—·— A Line

LATERAL CHROMATIC ABERRATION y=5.95

—— S
— — M

ASTIGMATISM y=5.95

DISTORTION

FNo.=2.8

-0.2  0.2

SPHERICAL
ABERRATION

CHROMATIC
ABERRATION y=5.95

——— d Line
······· g Line
- - - C Line
-·-·- A Line

-0.1  0.1

LATERAL
CHROMATIC
ABERRATION y=5.95

— S
- - M

-0.1  0.1

ASTIGMATISM y=5.95

-0.1 (%) 0.1

DISTORTION

Fig.9
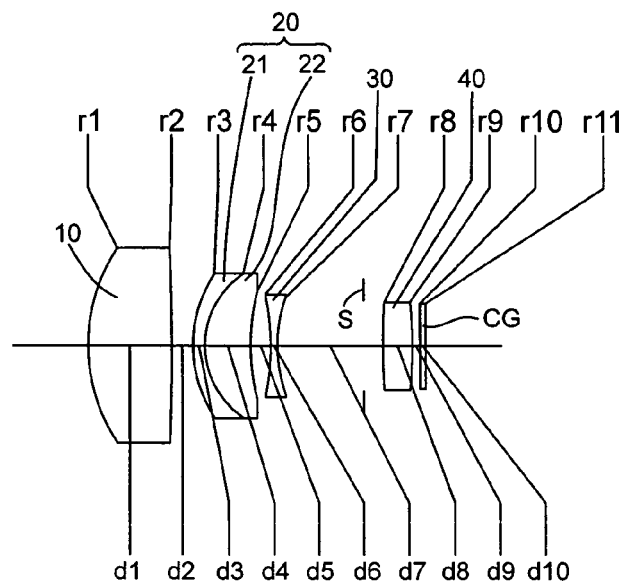
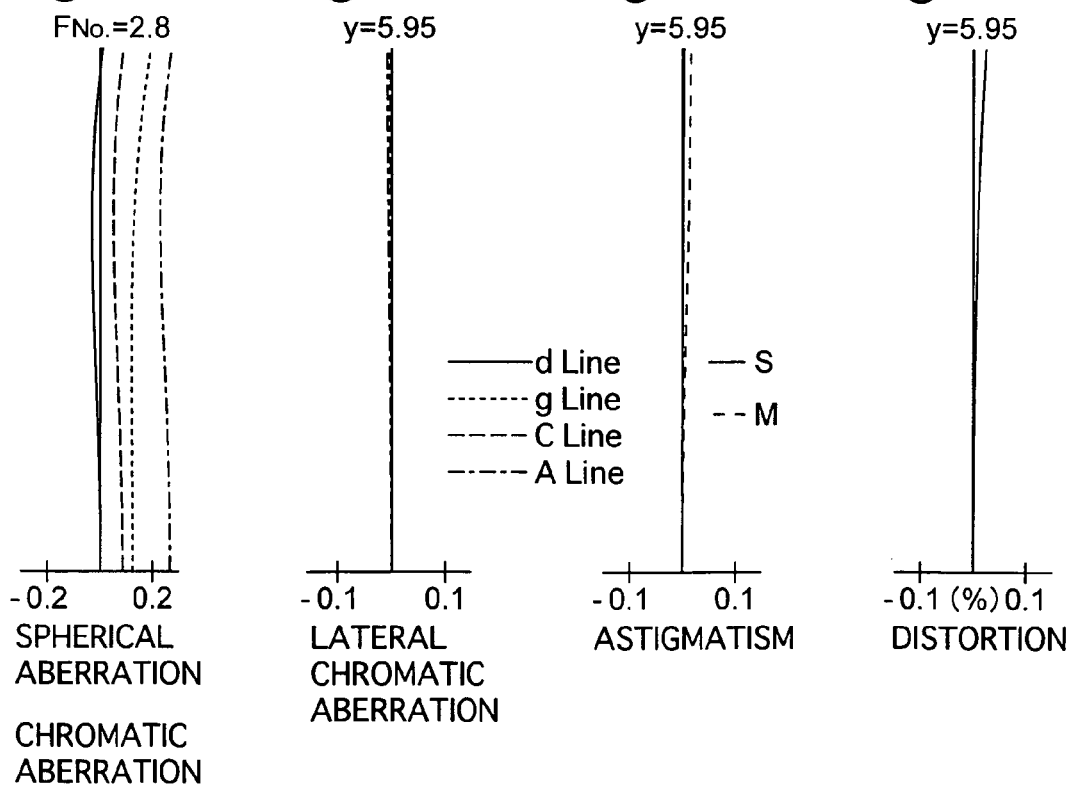
Fig.10A  Fig.10B  Fig.10C  Fig.10D

SPHERICAL ABERRATION

CHROMATIC ABERRATION

LATERAL CHROMATIC ABERRATION

ASTIGMATISM

DISTORTION

FNo.=2.8

−0.2　0.2

SPHERICAL
ABERRATION

CHROMATIC
ABERRATION y=5.95

−0.1　0.1

LATERAL
CHROMATIC
ABERRATION

——— d Line
········· g Line
− − − C Line
−·−·− A Line y=5.95

−0.1　0.1

ASTIGMATISM

——— S
− − M y=5.95

−0.1 (%) 0.1

DISTORTION

TELEPHOTO LENS SYSTEM

BACKGROUND OF THE INVENTION

1. Field of the Invention

The present invention relates to a telephoto lens system, through which an object to be inspected (hereinafter, a test object) at a finite distance is photographed at a high definition, and subsequently the photographed test object is image-processed.

2. Description of the Prior Art

Most of conventional telephoto lens systems have been designed for photographing lens systems. Such a conventional telephoto lens system cannot be used for the purpose of inspecting a test object. The process of inspection is generally performed by photographing the test object at a high definition, and subsequently by an image-processing operation for the photographed test object.

For example, Japanese Unexamined Patent Publication No. Hei-8-201687 has disclosed a four-lens-group telephoto lens system constituted by four lens elements; however, in the telephoto lens system thereof, the correcting of chromatic aberration is insufficient. Accordingly, the telephoto lens system of this publication is not suitable for an image processing operation at a high definition.

Furthermore, Japanese Unexamined Patent Publication Nos. Hei-5-27163, Hei-7-301749 and Hei-8-234098 can be taken as other examples. However, the lens system of each publication cannot be used for an image-processing operation at a high definition. Here, the high definition means a resolving power of approximately more than 80 curved lines of a Nyquist frequency with respect to the entire image plane.

In regard to a light source for image processing, there are cases where only visible light is used, or where a mixture of visible light and near-infrared light is used. Here, it has been known that a focal point undesirably moves largely between the case where visible light is employed as the light source and the case where the mixture of visible light and near-infrared light is employed as the light source.

SUMMARY OF THE INVENTION

The present invention provides a telephoto lens system, in which (i) a test object at a finite distance can be photographed at a high definition, and subsequently the photographed test object can be image-processed, and (ii) a stable resolution quality with a minimum focal-point shift can be achieved regardless of the wavelength of a light source, i.e., visible light or the mixture of visible light and near-infrared light.

In a telephoto lens system of a four-lens-group arrangement, it has been found that constituting a second lens group by cemented lens elements of a positive lens element and a negative lens element regardless of the order thereof from the object can improve the telephoto lens system to the extent that an image-processing operation with a high definition can be performed; and the present invention is based on this finding.

According to an aspect of the present invention, there is provided a telephoto lens system of a four-lens-group arrangement including a first lens group having a positive refractive power (hereinafter, a positive first lens group), a second lens group having a positive or negative refractive power (hereinafter, a positive or negative second lens group), a third lens group having a negative refractive power (hereinafter, a negative third lens group) and a fourth lens group having a positive refractive power (hereinafter, a positive fourth lens group), in this order from the object.

The telephoto lens system of the four-lens-group arrangement is constituted by six lens elements or less in total.

The positive or negative second lens group is constituted by a positive lens element and a negative lens element which are cemented to each other, in this order from the object. The positive lens element has a convex surface with a larger curvature facing toward the object.

The positive or negative second lens group satisfies the following condition:

$$0.8 < f2p/|f2n| < 1.4 \qquad (1)$$

wherein f2p designates the focal length of the positive lens element of the positive or negative second lens group; and f2n designates the focal length of the negative lens element of the positive or negative second lens group.

According to another aspect of the present invention, there is provided a telephoto lens system of a four-lens-group arrangement including a positive first lens group, a positive second lens group, a negative third lens group and a positive fourth lens group, in this order from the object.

The telephoto lens system of the four-lens-group arrangement is constituted by six lens elements or less in total.

The positive second lens group is constituted by a negative meniscus lens element and a positive lens element which are cemented to each other, in this order from the object.

The negative meniscus lens element has the convex surface facing toward the object; and the positive lens element has a convex surface with a larger curvature facing toward the object.

The positive second lens group satisfies the following condition:

$$0.4 < f2p/|f2n| < 0.8 \qquad (1')$$

wherein f2p designates the focal length of the positive lens element of the positive second lens group; and f2n designates the focal length of the negative lens element of the positive second lens group.

According to the telephoto lens system of the present invention, the positive first lens group, the negative third lens group and the positive fourth lens group can be simply constituted by a single lens element.

Alternatively, the positive first lens group and the positive fourth lens group can be constituted by a single lens element respectively; and the negative third lens group can be constituted by a negative lens element and a positive lens element which are cemented to each other in this order from the object.

The telephoto lens system of the present invention preferably satisfies the following conditions with respect to any one of the above-mentioned aspects of the present invention:

$$70 < v2p \qquad (2)$$

$$20 < v2p - v2n < 60 \qquad (3)$$

wherein v2p designates the Abbe number of the positive lens element of the positive or negative second lens group; and v2n designates the Abbe number of the negative lens element of the positive or negative second lens group.

The telephoto lens system of the present invention preferably satisfies the following condition:

$$80 < \nu 2p \quad (2')$$

According to further aspect of the present invention, there is provided a telephoto lens system of a four-lens-group arrangement including a positive first lens group, a positive or negative second lens group, a negative third lens group and a positive fourth lens group, in this order from the object.

The telephoto lens system of the four-lens-group arrangement is constituted by six lens elements or less in total.

The positive or negative second lens group is constituted by a positive lens element and a negative meniscus lens element which are cemented to each other in this order from the object, or by a negative lens element and a positive lens element which are cemented to each other in this order from the object.

The positive or negative second lens group satisfies the following condition:

$$70 < \nu 2p \quad (2)$$

$$20 < \nu 2p - \nu 2n < 60 \quad (3)$$

wherein

ν2p designates the Abbe number of the positive lens element of the positive or negative second lens group; and ν2n designates the Abbe number of the negative lens element of the positive or negative second lens group.

The telephoto lens system of the present invention preferably satisfies the following condition with respect to any one of the above-mentioned aspects of the present invention:

$$0.15 < Dp/f < 0.5 \quad (4)$$

wherein

Dp designates the sum of the thickness of the positive first lens group and that of the positive or negative second lens group; and f designates the focal length of said telephoto lens system.

The present disclosure relates to subject matter contained in Japanese Patent Application No. 2004-245063 (filed on Aug. 25, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the telephoto lens system according to a first embodiment of the present invention;

FIGS. 2A, 2B, 2C and 2D show aberrations occurred in the lens arrangement shown in FIG. 1;

FIG. 3 is a lens arrangement of the telephoto lens system according to a second embodiment of the present invention;

FIGS. 4A, 4B, 4C and 4D show aberrations occurred in the lens arrangement shown in FIG. 3;

FIG. 9 is a lens arrangement of the telephoto lens system according to a fifth embodiment of the present invention;

FIGS. 10A, 10B, 10C and 10D show aberrations occurred in the lens arrangement shown in FIG. 9;

DESCRIPTION OF THE PREFERRED EMBODIMENTS

Figure 5:
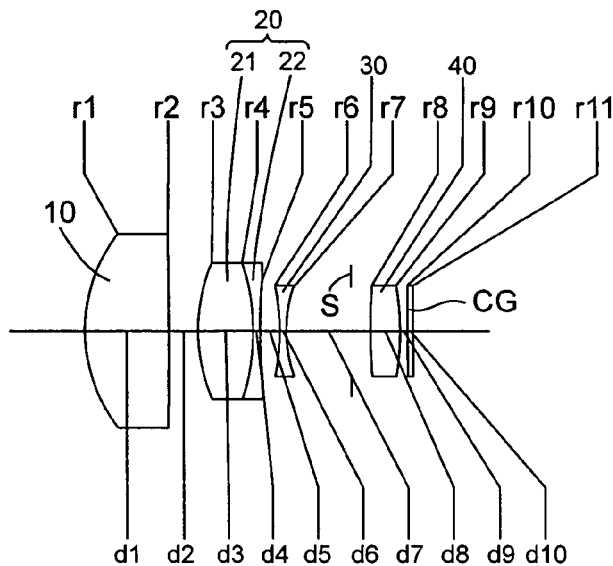
FIG. 5 is a lens arrangement of the telephoto lens system according to a third embodiment of the present invention.
Figure 6A:
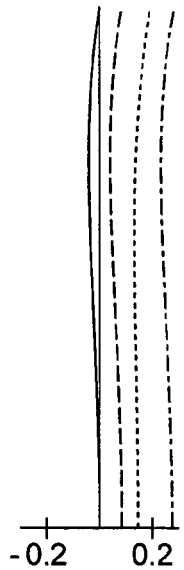
FIGS. 6A, 6B, 6C and 6D show aberrations occurred in the lens arrangement shown in FIG. 5.
Figure 6B:
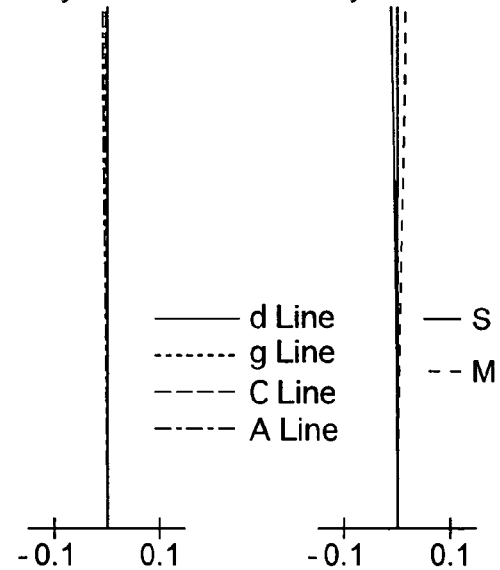
Figure 6C:
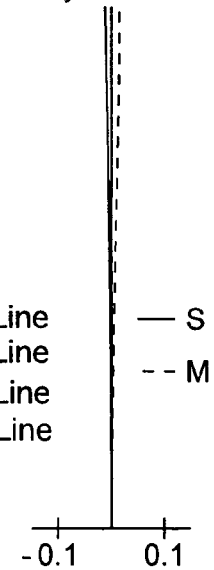
Figure 6D:
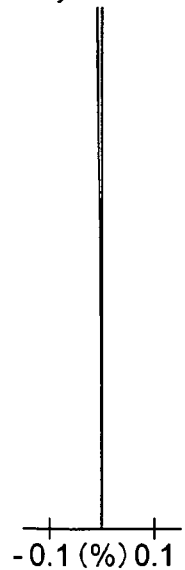

The telephoto lens system of the present invention, as shown in FIGS. 1, 3, 5, 7, 9, 11, 13 and 15, includes a positive first lens group 10, a positive or negative second lens group 20, a negative third lens group 30, and a positive fourth lens group 40, in this order from the object.

In each embodiment, the positive or negative second lens group 20 includes a positive lens element and a negative lens element which are cemented to each other in this order from the object, or includes a negative lens element and a positive lens element which are cemented to each other in this order from the object.

In the first through sixth embodiments, the positive first lens group 10, the negative third lens group 30 and the positive fourth lens group 40 are respectively constituted by a single lens element. In other words, the telephoto lens system of the first through sixth embodiments has the five lens elements constituting the four lens groups.

In the seventh and eighth embodiments, the negative third lens group 30 is constituted by negative lens element and a positive lens element which are cemented to each other in this order from the object. In other words, the telephoto lens system of the seventh and eighth embodiments has the six lens elements constituting the four lens groups.

A diaphragm S is provided between the negative third lens group 30 and the positive fourth lens group 40.

Focusing is performed by moving the entire telephoto lens system in the optical axis direction.

According to the first to third embodiments and the seventh and eighth embodiments, the positive or negative second lens group 20 is constituted by a positive lens element having a convex surface with a larger curvature facing toward the object and a negative lens element, in this order from the object. Here, note that the combined refractive power of the cemented lens elements can be either positive or negative.

More specifically, in the first to third embodiments, the refractive power of the second lens group 20 is negative; and in the seventh and eighth embodiments, the refractive power of the second lens group 20 is positive.

The above-explained arrangements of the positive or negative second lens group 20 preferably satisfy condition (1), since the negative lens element thereof is closer to the diaphragm S.

If |f2p/|f2n|| exceeds the lower limit of condition (1), chromatic aberration is undercorrected.

If |f2p/|f2n|| exceeds the upper limit of condition (1), chromatic aberration is overcorrected.

According to the fourth to sixth embodiments, the refractive power of the second lens group 20 is positive. The positive second lens group 20 is constituted by a negative meniscus lens element and a positive lens element, in this order from the object.

The negative meniscus lens element has the convex surface facing toward the object; and the positive lens element has a convex surface with a larger curvature facing toward the object.

The second lens group 20 of this arrangement is concentric with respect to the diaphragm, and is advantageous for the correcting of distortion.

The negative lens element is distant from the diaphragm, and is formed into the negative meniscus lens element which has the convex surface facing toward the object. Therefore the refractive power of the negative meniscus lens element and that of the positive lens element preferably satisfy condition (1').

If f2p/|f2n| exceeds the lower limit of condition (1'), chromatic aberration is undercorrected.

If f2p/|f2n| exceeds the upper limit of condition (1'), chromatic aberration is undercorrected. Moreover, spherical aberration of higher order and coma occur.

It has been generally known that in the telephoto lens system, an object-side lens element made of a low-dispersion glass material can reduce chromatic aberration. Furthermore, in the present invention, the positive or negative second lens group 20 includes cemented lens elements; and it should be noted that a positive lens element of the cemented lens element is made of a low-dispersion glass material which satisfies condition (2). Namely, a glass material which does not satisfy condition (2) cannot sufficiently correct chromatic aberration. If an attempt is made to more sufficiently correct chromatic aberration, a glass material preferably satisfies condition (2').

Condition (3) specifies the difference in the Abbe number between the positive lens element and the negative lens element of the cemented lens elements constituting the positive or negative second lens group 20.

If v2p–v2n exceeds the lower limit of condition (3), chromatic aberration is undercorrected.

If v2p–v2n exceeds the upper limit of condition (3), chromatic aberration is overcorrected.

Condition (4) specifies the thickness of the positive first lens group 10 and that of the positive second lens group 20.

For the purpose of correcting chromatic aberration, the thickness of a positive lens group is preferably larger.

Furthermore, according to the combination of an appropriate thickness of a positive lens group and a suitable glass material satisfying conditions (2) and (3), chromatic aberration can be more suitably corrected.

If Dp/f exceeds the lower limit of condition (4), chromatic aberration is undercorrected.

If Dp/f exceeds the upper limit of condition (4), it is advantageous for correcting chromatic aberration. However, the thickness of the positive first lens group 10 and that of the positive second lens group 20 become larger, so that the distance between the negative third lens group 30 and the positive fourth lens group 40 becomes shorter. Consequently, the correcting of coma and astigmatism becomes difficult.

Specific numerical data of the embodiments will be described hereinafter.

In the diagrams of chromatic aberration (axial chromatic aberration) represented by spherical aberration, the solid line and the three types of dotted lines respectively indicate spherical aberrations with respect to the d, g, C and A lines.

In the diagrams of lateral chromatic aberration, the three types of dotted lines respectively indicate magnification with respect to the g, C and A lines; however, the d line as the base line coincides with the ordinate.

In the diagrams of astigmatism, S designates the sagittal image, and M designates the meridional image.

In the tables, $F_{NO.}$ designates the f-number, f designates the focal length of the telephoto lens system, m designates the lateral magnification, y designates the image height, $f_B$ designates the back focal distance, r designates the radius of curvature, d designates the lens-element thickness or distance between lens elements, Nd designates the refractive index of the d-line, and v designates the Abbe number.

Embodiment 1

FIG. 1 is the lens arrangement of the telephoto lens system according to the first embodiment of the present invention. FIGS. 2A through 2D show aberrations occurred in the lens arrangement shown in FIG. 1. Table 1 shows the numerical data of the first embodiment.

The telephoto lens system includes a biconvex positive lens element 10 (first lens group) having a convex surface with a large curvature facing toward the object, cemented lens elements 20 (second lens group) having a biconvex positive lens element 21 and a biconcave negative lens element 22 in this order from the object, a biconcave negative lens element 30 (third lens group), a diaphragm S, and a biconvex positive lens element 40 (fourth lens group), in this order from the object. Here, note that the refractive power of the second lens group 20 is negative.

A cover glass CG (surface Nos. 10 and 11) is provided behind the positive fourth lens group 40.

The diaphragm S is provided 8.640 behind (on the image side of) the negative third lens group 30 (surface No. 7).

TABLE 1

$F_{NO.}$ = 1:2.8 (an object at infinity is in an in-focus state)
f = 72.78
m = −0.378
$f_B$ = 56.95
y = 5.95

| Surf. No. | r | d | Nd | v |
|---|---|---|---|---|
| 1 | 21.649 | 11.00 | 1.51633 | 64.1 |
| 2 | −744.711 | 3.91 | | |
| 3 | 23.588 | 7.46 | 1.49700 | 81.6 |
| 4 | −27.832 | 0.90 | 1.83400 | 37.2 |
| 5 | 56.851 | 2.64 | | |
| 6 | −29.920 | 0.90 | 1.66998 | 39.3 |
| 7 | 19.230 | 11.14 | | |
| 8 | 83.620 | 3.92 | 1.80400 | 46.6 |
| 9 | −37.468 | 1.00 | | |
| 10 | ∞ | 0.75 | 1.51633 | 64.1 |
| 11 | ∞ | — | | |

Embodiment 2

FIG. 3 is the lens arrangement of the telephoto lens system according to the second embodiment of the present invention. FIGS. 4A through 4D show aberrations occurred in the lens arrangement shown in FIG. 3. Table 2 shows the numerical data of the second embodiment.

The lens arrangement of the telephoto lens system of the second embodiment is the same as that of the first embodiment. Here, note that the refractive power of the second lens group 20 is negative.

The diaphragm S is provided 8.640 behind (on the image side of) the negative third lens group 30 (surface No. 7).

TABLE 2

$F_{NO.}$ = 1:2.8 (an object at infinity is in an in-focus state)
f = 72.78
m = −0.377
$f_B$ = 57.41
y = 5.95

| Surf. No. | r | d | Nd | ν |
|---|---|---|---|---|
| 1 | 21.955 | 11.00 | 1.51633 | 64.1 |
| 2 | −654.053 | 3.91 | | |
| 3 | 23.564 | 7.46 | 1.45600 | 90.3 |
| 4 | −29.615 | 0.90 | 1.83400 | 37.2 |
| 5 | 71.533 | 2.64 | | |
| 6 | −31.381 | 0.90 | 1.66998 | 39.3 |
| 7 | 19.583 | 11.18 | | |
| 8 | 84.238 | 3.92 | 1.80400 | 46.6 |
| 9 | −38.174 | 1.00 | | |
| 10 | ∞ | 0.75 | 1.51633 | 64.1 |
| 11 | ∞ | — | | |

Embodiment 3

FIG. 5 is the lens arrangement of the telephoto lens system according to the third embodiment of the present invention. FIGS. 6A through 6D show aberrations occurred in the lens arrangement shown in FIG. 5. Table 3 shows the numerical data of the third embodiment.

The lens arrangement of the telephoto lens system of the third embodiment is the same as that of the first embodiment. Here, note that the refractive power of the second lens group 20 is negative.

The diaphragm S is provided 8.640 behind (on the image side of) the negative third lens group 30 (surface No. 7).

TABLE 3

$F_{NO.}$ = 1:2.8 (an object at infinity is in an in-focus state)
f = 72.78
m = −0.376
$f_B$ = 57.04
y = 5.95

| Surf. No. | r | d | Nd | ν |
|---|---|---|---|---|
| 1 | 21.667 | 11.00 | 1.51633 | 64.1 |
| 2 | −928.005 | 3.91 | | |
| 3 | 22.936 | 7.46 | 1.43875 | 95.0 |
| 4 | −28.851 | 0.90 | 1.83400 | 37.2 |
| 5 | 77.361 | 2.64 | | |
| 6 | −31.578 | 0.90 | 1.66998 | 39.3 |
| 7 | 19.264 | 11.18 | | |
| 8 | 81.380 | 3.92 | 1.80400 | 46.6 |
| 9 | −38.255 | 1.00 | | |
| 10 | ∞ | 0.75 | 1.51633 | 64.1 |
| 11 | ∞ | — | | |

Embodiment 4

Figure 7:
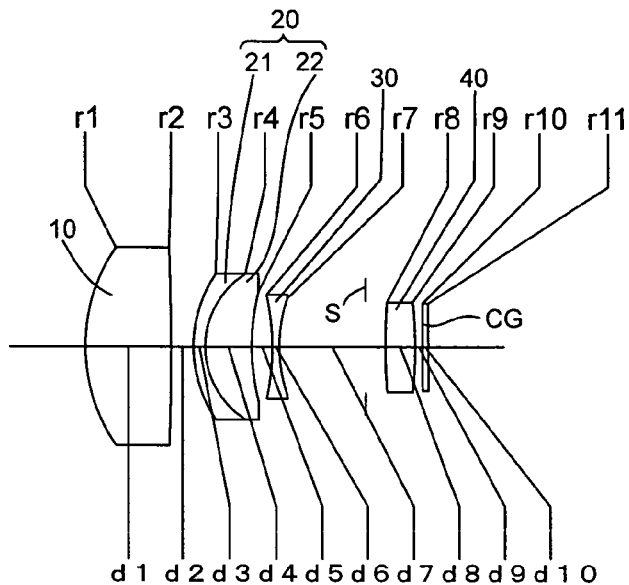
FIG. 7 is a lens arrangement of the telephoto lens system according to a fourth embodiment of the present invention.
Figure 8A:
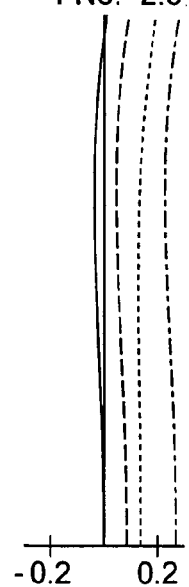
FIGS. 8A, 8B, 8C and 8D show aberrations occurred in the lens arrangement shown in FIG. 7.
Figure 8B:
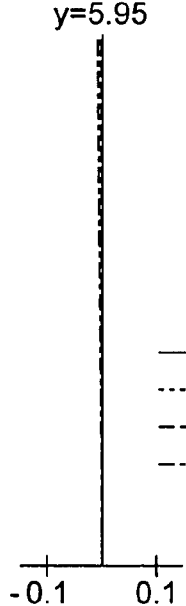
Figure 8C:
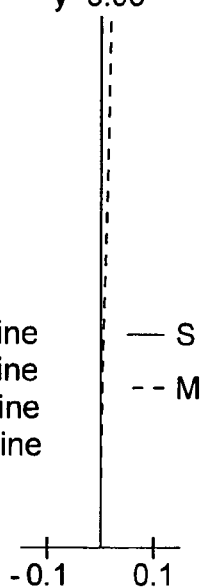
Figure 8D:
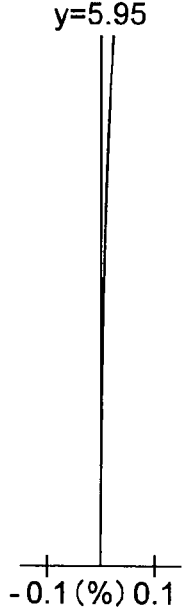

FIG. 7 is the lens arrangement of the telephoto lens system according to the fourth embodiment of the present invention. FIGS. 8A through 8D show aberrations occurred in the lens arrangement shown in FIG. 7. Table 4 shows the numerical data of the fourth embodiment.

In the telephoto lens system of the fourth embodiment, the second lens group 20 is constituted by a negative lens element and a positive lens element, i.e., the negative meniscus lens element 21 having the convex surface facing toward the object and the positive meniscus lens element 22 having the convex surface facing toward the object, in this order from the object, unlike the second lens group 20 according to the first to third embodiments. Here, note that the refractive power of the second lens group 20 of the fourth embodiment is positive.

The diaphragm S is provided 11.306 behind (on the image side of) the negative third lens group 30 (surface No. 7).

TABLE 4

$F_{NO.}$ = 1:2.8 (an object at infinity is in an in-focus state)
f = 72.78
m = −0.384
$f_B$ = 57.40
y = 5.95

| Surf. No. | r | d | Nd | ν |
|---|---|---|---|---|
| 1 | 23.500 | 11.00 | 1.48749 | 70.2 |
| 2 | −349.022 | 2.80 | | |
| 3 | 17.505 | 1.50 | 1.65830 | 57.3 |
| 4 | 11.448 | 6.00 | 1.45600 | 90.3 |
| 5 | 30.417 | 2.64 | | |
| 6 | −31.469 | 0.90 | 1.63980 | 34.5 |
| 7 | 19.747 | 13.85 | | |
| 8 | 88.633 | 3.92 | 1.80400 | 46.6 |
| 9 | −55.550 | 1.00 | | |
| 10 | ∞ | 0.75 | 1.51633 | 64.1 |
| 11 | ∞ | — | | |

Embodiment 5

FIG. 9 is the lens arrangement of the telephoto lens system according to the fifth embodiment of the present invention. FIGS. 10A through 10D show aberrations occurred in the lens arrangement shown in FIG. 9. Table 5 shows the numerical data of the fifth embodiment.

The lens arrangement of the telephoto lens system of the fifth embodiment is the same as the fourth embodiment. Here, note that the refractive power of the second lens group 20 is positive.

The diaphragm S is provided 11.587 behind (on the image side of) the negative third lens group 30 (surface No. 7).

TABLE 5

$F_{NO.}$ = 1:2.8 (an object at infinity is in an in-focus state)
f = 72.78
m = −0.383
$f_B$ = 57.17
y = 5.95

| Surf. No. | r | d | Nd | ν |
|---|---|---|---|---|
| 1 | 23.645 | 11.00 | 1.48749 | 70.2 |
| 2 | −302.856 | 2.76 | | |
| 3 | 18.112 | 1.50 | 1.69680 | 56.5 |
| 4 | 11.699 | 6.00 | 1.49700 | 81.6 |
| 5 | 30.225 | 2.64 | | |
| 6 | −32.198 | 0.90 | 1.64769 | 33.8 |
| 7 | 19.645 | 14.13 | | |
| 8 | 89.622 | 3.92 | 1.80400 | 46.6 |
| 9 | −55.829 | 1.00 | | |
| 10 | ∞ | 0.75 | 1.51633 | 64.1 |
| 11 | ∞ | — | | |

Embodiment 6

Figure 11:
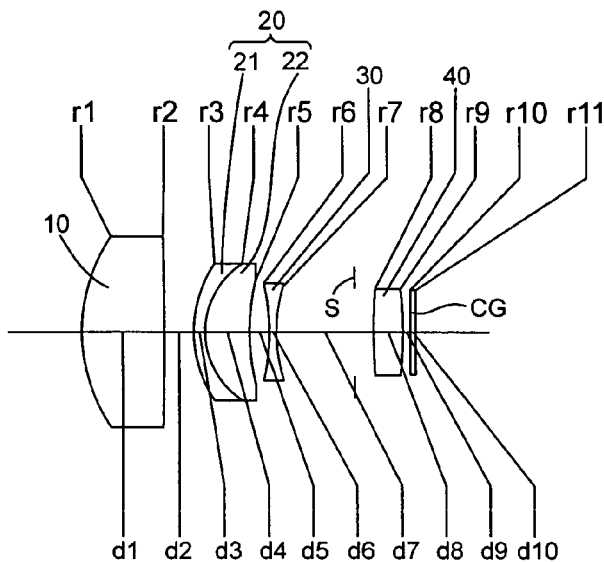
FIG. 11 is a lens arrangement of the telephoto lens system according to a sixth embodiment of the present invention.
Figures 12A, 12B, 12C, 12D:
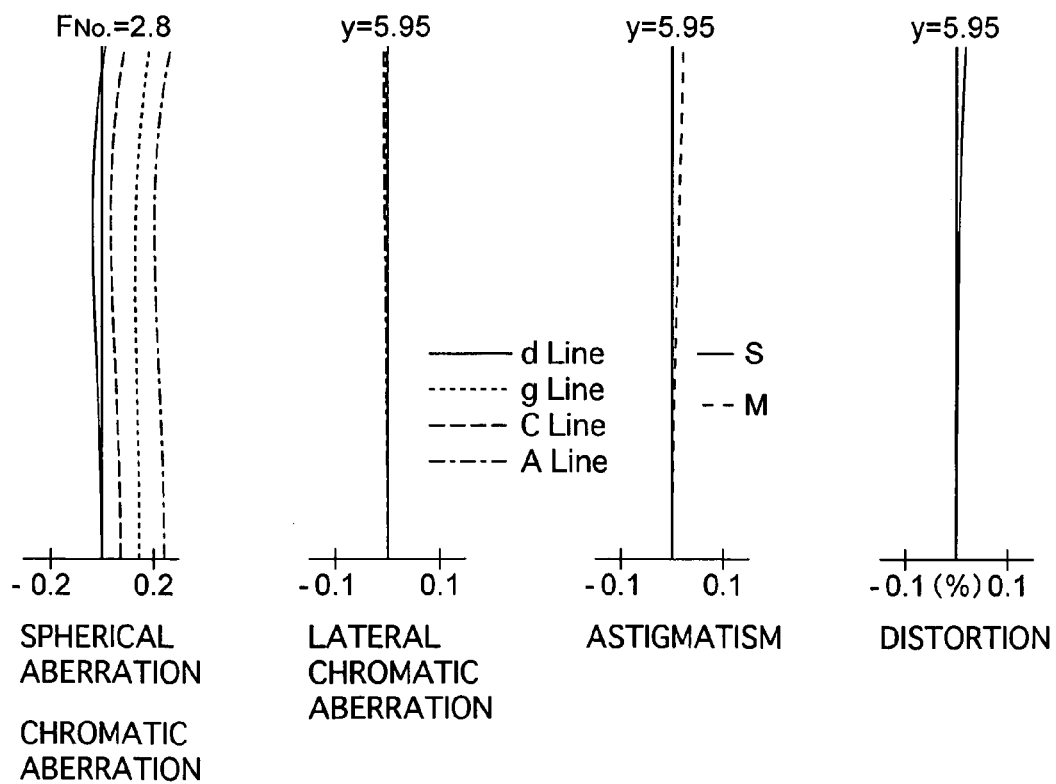
FIGS. 12A, 12B, 12C and 12D show aberrations occurred in the lens arrangement shown in FIG. 11.

FIG. 11 is the lens arrangement of the telephoto lens system according to the sixth embodiment of the present invention. FIGS. 12A through 12D show aberrations occurred in the lens arrangement shown in FIG. 11. Table 6 shows the numerical data of the sixth embodiment.

The lens arrangement of the telephoto lens system of the sixth embodiment is the same as the fourth embodiment. Here, note that the refractive power of the second lens group 20 is positive.

The diaphragm S is provided 10.692 behind (on the image side of) the negative third lens group 30 (surface No. 7).

TABLE 6

$F_{NO.} = 1:2.8$ (an object at infinity is in an in-focus state)
f = 72.78
m = −0.379
$f_B$ = 57.08
y = 5.95

| Surf. No. | r | d | Nd | ν |
|---|---|---|---|---|
| 1 | 23.472 | 11.00 | 1.48749 | 70.2 |
| 2 | −767.320 | 3.91 | | |
| 3 | 17.203 | 1.50 | 1.64250 | 58.4 |
| 4 | 11.203 | 6.00 | 1.43875 | 95.0 |
| 5 | 31.210 | 2.64 | | |
| 6 | −29.019 | 0.90 | 1.64769 | 33.8 |
| 7 | 20.574 | 13.23 | | |
| 8 | 91.455 | 3.92 | 1.80400 | 46.6 |
| 9 | −48.899 | 1.00 | | |
| 10 | ∞ | 0.75 | 1.51633 | 64.1 |
| 11 | ∞ | — | | |

Embodiment 7

Figure 13:
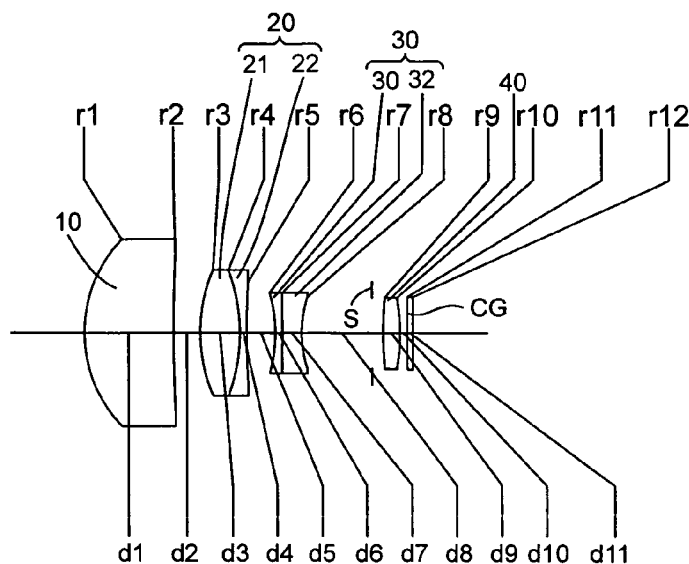
FIG. 13 is a lens arrangement of the telephoto lens system according to a seventh embodiment of the present invention.
Figures 14A, 14B, 14C, 14D:
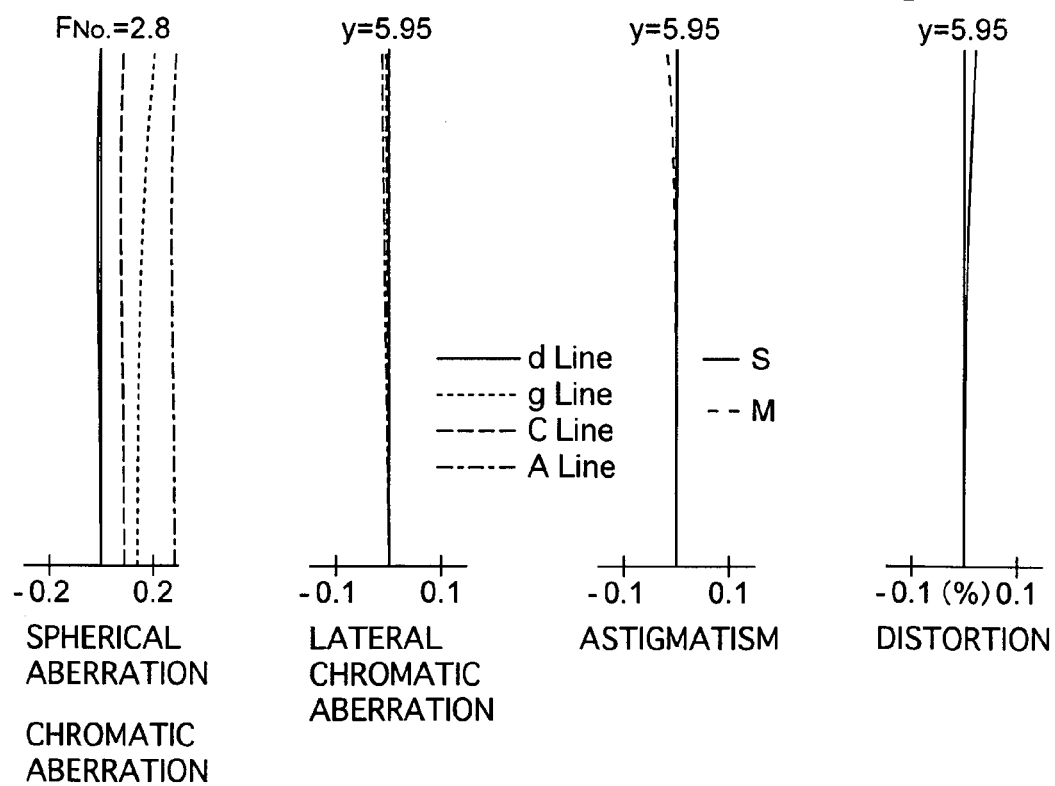
FIGS. 14A, 14B, 14C and 14D show aberrations occurred in the lens arrangement shown in FIG. 13.

FIG. 13 is the lens arrangement of the telephoto lens system according to the seventh embodiment of the present invention. FIGS. 14A through 14D show aberrations occurred in the lens arrangement shown in FIG. 13. Table 7 shows the numerical data of the seventh embodiment.

The lens arrangement of the telephoto lens system of the seventh embodiment is the same as the first embodiment except that the negative third lens group 30 is constituted by cemented lens elements having the negative meniscus lens element 31 having the convex surface facing toward the image and the biconcave lens element 32, in this order from the object. Here, note that the refractive power of the second lens group 20 is positive.

The cover glass CG (surface Nos. 11 and 12) is provided behind the positive fourth lens group 40.

The diaphragm S is provided 9.420 behind (on the image side of) the negative third lens group 30 (surface No. 8).

TABLE 7

$F_{NO.} = 1:2.8$ (an object at infinity is in an in-focus state)
f = 72.76
m = −0.382
$f_B$ = 51.81
y = 5.95

| Surf. No. | r | d | Nd | ν |
|---|---|---|---|---|
| 1 | 18.244 | 11.90 | 1.48749 | 70.2 |
| 2 | 232.689 | 3.53 | | |
| 3 | 22.249 | 5.20 | 1.49700 | 81.6 |
| 4 | −24.627 | 0.91 | 1.74950 | 35.3 |
| 5 | 108.131 | 3.90 | | |
| 6 | −19.940 | 0.90 | 1.80610 | 40.9 |
| 7 | −416.223 | 2.58 | 1.51633 | 64.1 |
| 8 | 16.093 | 10.92 | | |
| 9 | 60.837 | 2.17 | 1.64850 | 53.0 |
| 10 | −30.002 | 1.00 | | |

TABLE 7-continued $F_{NO.} = 1:2.8$ (an object at infinity is in an in-focus state)
f = 72.76
m = −0.382
$f_B$ = 51.81
y = 5.95

| Surf. No. | r | d | Nd | ν |
|---|---|---|---|---|
| 11 | ∞ | 0.75 | 1.51633 | 64.1 |
| 12 | ∞ | — | | |

Embodiment 8

Figure 15:
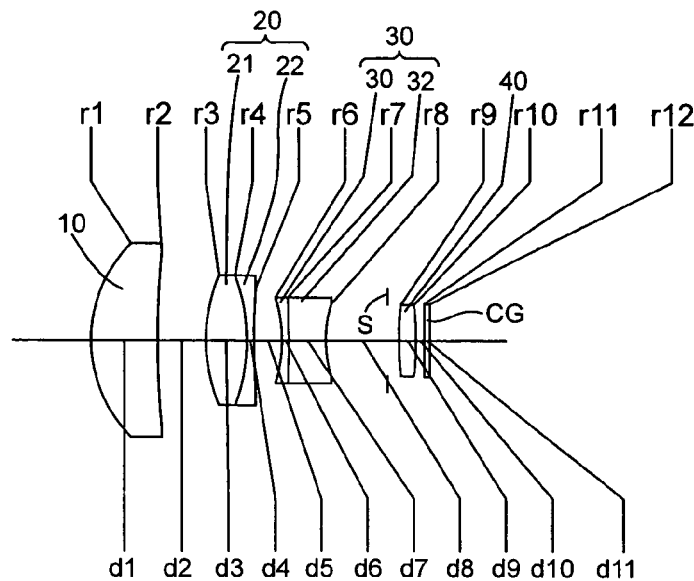
FIG. 15 is a lens arrangement of the telephoto lens system according to an eighth embodiment of the present invention.
Figure 16A:
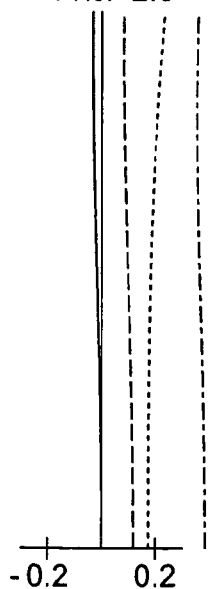
FIGS. 16A, 16B, 16C and 16D show aberrations occurred in the lens arrangement shown in FIG. 15.
Figure 16B:
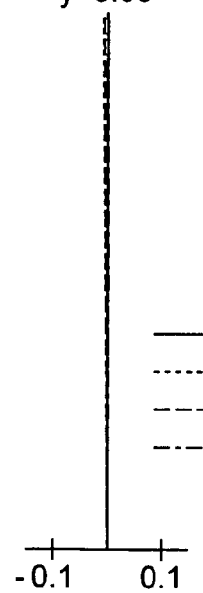
Figure 16C:
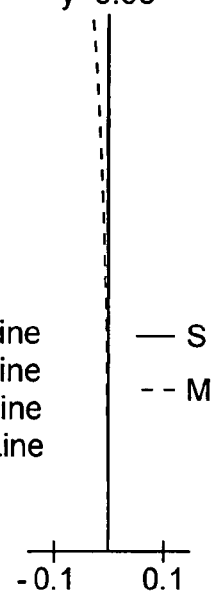
Figure 16D:
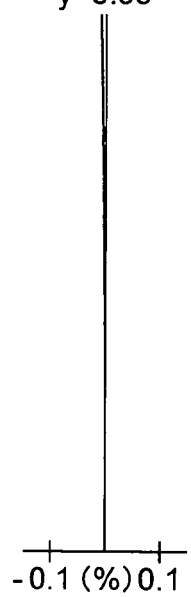

FIG. 15 is the lens arrangement of the telephoto lens system according to the eighth embodiment of the present invention. FIGS. 16A through 16D show aberrations occurred in the lens arrangement shown in FIG. 15. Table 8 shows the numerical data of the eighth embodiment.

The lens arrangement of the eighth embodiment is the same as that of the seventh embodiment. Here, note that the refractive power of the second lens group 20 is positive.

The diaphragm S is provided 7.960 behind (on the image side of) the negative third lens group 30 (surface No. 8).

TABLE 8

$F_{NO.} = 1:2.8$ (an object at infinity is in an in-focus state)
f = 72.83
m = −0.392
$f_B$ = 51.59
y = 5.95

| Surf. No. | r | d | Nd | ν |
|---|---|---|---|---|
| 1 | 17.945 | 8.60 | 1.48749 | 70.2 |
| 2 | 129.666 | 6.18 | | |
| 3 | 21.877 | 5.26 | 1.48749 | 70.2 |
| 4 | −24.813 | 0.90 | 1.72151 | 29.2 |
| 5 | 107.743 | 3.60 | | |
| 6 | −18.872 | 0.90 | 1.74320 | 49.3 |
| 7 | −137.371 | 4.86 | 1.51633 | 64.1 |
| 8 | 16.315 | 9.46 | | |
| 9 | 46.967 | 2.24 | 1.65844 | 50.9 |
| 10 | −36.144 | 1.00 | | |
| 11 | ∞ | 0.75 | 1.51633 | 64.1 |
| 12 | ∞ | — | | |

Table 9 shows the numerical values of each embodiment for each condition.

TABLE 9

| | Embod. 1 | Embod. 2 | Embod. 3 | Embod. 4 | Embod. 5 |
|---|---|---|---|---|---|
| Condition (1) | 1.210 | 1.023 | 1.214 | — | — |
| Condition (1') | — | — | — | 0.657 | 0.661 |
| Condition (2) | 81.6 | 90.3 | 95.0 | 90.3 | 81.6 |
| Condition (3) | 44.4 | 53.1 | 57.8 | 33.0 | 25.1 |
| Condition (4) | 0.266 | 0.266 | 0.266 | 0.254 | 0.254 |

| | Embod. 6 | Embod. 7 | Embod. 8 |
|---|---|---|---|
| Condition (1) | — | 0.915 | 0.888 |
| Condition (1') | 0.659 | — | — |
| Condition (2) | 95.0 | 81.6 | 70.2 |
| Condition (3) | 36.6 | 46.3 | 41.0 |
| Condition (4) | 0.254 | 0.248 | 0.203 |

As can be understood from Table 9, the numerical values of the first through eighth embodiments satisfy each condition, and the various aberrations are also adequately corrected.

In particular, as can be seen from the diagrams of chromatic aberration (axial chromatic aberration) and the diagrams of lateral chromatic aberration, the difference between aberrations with respect to the A-line (near-infrared light) and aberrations with respect to the d-line, g-line, and C-line is small. Due to these aberrations, it is understood that there is substantially no focal-point shift between the case where visible light is employed as the light source and the case where the mixture of visible light and near-infrared light is employed as the light source.

According to the above description, a telephoto lens system with the following features can be achieved:

(i) a test object at a finite distance can be photographed at a high definition, and subsequently the photographed test object can be image-processed; and (ii) a stable resolution quality with a minimum focal-point shift can be achieved regardless of the wavelength of a light source, i.e., visible light or the mixture of visible light and near-infrared light.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A telephoto lens system of at least a four-lens-group arrangement comprises a positive first lens group, a positive or negative second lens group, a negative third lens group and a positive fourth lens group, in this order from an object,
    wherein said telephoto lens system of the at least four-lens-group arrangement comprises six lens elements or less in total;
    wherein said positive or negative second lens group comprises a positive lens element and a negative lens element that are cemented to each other, in this order from the object;
    wherein said positive lens element has a convex surface facing toward the object side, said convex surface having a larger curvature than a surface of the positive lens element facing toward the image side;
    wherein said positive or negative second lens group satisfies the following condition:

$0.8 < f2p/|f2n| < 1.4$ wherein
    f2p designates the focal length of said positive lens element of said second lens group; and
    f2n designates the focal length of said negative lens element of said second lens group; and
    wherein the telephoto lens system satisfies the following conditions:

$80 < v2p$ $20 < v2p - v2n < 60$ wherein
    v2p designates the Abbe number of said positive lens element of said positive or negative second lens group; and
    v2n designates the Abbe number of said negative lens element of said positive or negative second lens group.

2. The telephoto lens system according to claim 1, wherein said positive first lens group, said negative third lens group and said positive fourth lens group respectively comprise a single lens element.

3. The telephoto lens system according to claim 1, wherein said positive first lens group and said positive fourth lens group respectively comprise a single lens element; and
    wherein said negative third lens group comprises a negative lens element and a positive lens element that are cemented to each other in this order from the object.

4. The telephoto lens system according to claim 1, satisfying the following condition:

$0.15 < Dp/f < 0.5$ wherein
    Dp designates the sum of the thickness of said positive first lens group and that of said positive or negative second lens group; and
    f designates the focal length of said telephoto lens system.

5. A telephoto lens system of at least a four-lens-group arrangement comprises a positive first lens group, a positive second lens group, a negative third lens group and a positive fourth lens group, in this order from an object,
    wherein said telephoto lens system of the at least four-lens-group arrangement comprises six lens elements or less in total;
    wherein said positive second lens group comprises a negative meniscus lens element and a positive lens element that are cemented to each other, in this order from the object;
    wherein said negative meniscus lens element has the a convex surface facing toward the object side, and the positive lens element has a convex surface facing toward the object side, said convex surface of the positive lens element having a larger curvature than a surface of the positive lens element facing toward the image side;
    wherein said positive second lens group satisfies the following condition:

$0.4 < f2p/|f2n| < 0.8$ wherein
    f2p designates the focal length of said positive lens element of said second lens group; and
    f2n designates the focal length of said negative lens element of said second lens group; and
    wherein the telephoto lens system satisfies the following conditions:

$70 < v2p$ $20 < v2p - v2n < 60$ wherein
    v2p designates the Abbe number of said positive lens element of said positive second lens group; and
    v2n designates the Abbe number of said negative lens element of said positive second lens group.

6. The telephoto lens system according to claim 5, wherein said positive first lens group, said negative third lens group and said positive fourth lens group respectively comprise a single lens element.

7. The telephoto lens system according to claim 5, satisfying the following condition:

$80 < v2p$ wherein
    v2p designates the Abbe number of said positive lens element of said positive second lens group.

8. The telephoto lens system according to claim 5, satisfying the following condition:

$$0.15 < Dp/f < 0.5$$

wherein

Dp designates the sum of the thickness of said positive first lens group and that of said positive second lens group; and f designates the focal length of said telephoto lens system.

9. A telephoto lens system of at least a four-lens-group arrangement comprises a positive first lens group, a positive or negative second lens group, a negative third lens group and a positive fourth lens group, in this order from the object, wherein said telephoto lens system of the at least four-lens-group arrangement comprises six lens elements or less in total;

wherein said positive or negative second lens group comprises a positive lens element and a negative lens element that are cemented to each other in this order from the object, or comprises a negative lens element and a positive lens element that are cemented to each other in this order from the object;

wherein said positive or negative second lens group satisfies the following condition:

$$70 < v2p$$

$$20 < v2p - v2n < 60$$

wherein v2p designates the Abbe number of said positive lens element of said positive or negative second lens group; and v2n designates the Abbe number of said negative lens element of said positive or negative second lens group; and wherein the telephoto lens system satisfies the following condition:

$$0.15 < Dp/f < 0.5$$

wherein

Dp designates the sum of the thickness of said positive first lens group and that of said positive or negative second lens group; and f designates the focal length of said telephoto lens system.

10. The telephoto lens system according to claim 9, wherein said positive first lens group, said negative third lens group and said positive fourth lens group respectively comprise a single lens element.

11. The telephoto lens system according to claim 9, satisfying the following condition:

$$80 < v2p$$

wherein v2p designates the Abbe number of said positive lens element of said positive or negative second lens group.

* * * * *